Patented May 1, 1951

2,551,463

UNITED STATES PATENT OFFICE 2,551,463

COATING FROZEN MEAT CUTS

John M. Ramsbottom, Chicago, Ill., assignor to Swift & Company, Chicago, Ill., a corporation of Illinois No Drawing. Application March 21, 1949, Serial No. 82,699

12 Claims. (Cl. 99—169)

This invention relates broadly to a method of coating meats, and more particularly to a method of coating frozen meat cuts or the like.

It has heretofore been suggested that meat cuts or carcasses be coated with various types of materials to aid in the preservation thereof. Among some of the types of coatings which have been suggested in othe prior art are ice, gelatin, caul fat, and various other coatings of varying compositions. Methods of applying the coatings have included among others the method of dipping a carcass in a solution of gelatin or the like to form an integral coating around the meat. In general, such coatings and methods for applying the same have been utilized with respect to unfrozen carcasses or to the so-called "table-ready" meats which have previously been smoked or cooked.

It has now been found desirable to provide frozen meat cuts with a protective coating to prevent damage to the said meat cuts in shipment and, in addition, to provide an attractive appearance to the finished product.

Therefore, it is an object of this invention to provide an improved method of coating frozen meat cuts.

It is a further object of this invention to provide an improved method of coating frozen meat cuts whereby a firmly adhering coating is affixed to the surface thereof.

Additional objects, if not specifically pointed out herein, will be apparent to one skilled in the art from the following detailed description of the invention.

Generally, this invention comprises treating frozen meat cuts with a thawing medium followed by the application thereto of a coating solution or the like whereby a coating is formed on the surface of the frozen meat cut and integral therewith.

More specifically, this invention provides a mens of overcoming what has been the outstanding difficulty in the coating of frozen meat cuts by a dipping process or otherwise, namely, the cracking or splitting away of the coating from the meat surface as the meat cut thaws. It has been found, as a result of a large number of dipping operations in commercial practice, that the problem of a coating which would adhere firmly to the frozen meat surface even when the meat cut began to thaw out as a result of temperature conditions in shipment or when placed on a butcher's shelves, was a very acute one from a merchandising standpoint. Referring, for the purpose of illustration only, to veal rolls which are commercially prepared from boned veal shoulders by forming the meat into a roll and tying it at spaced intervals with cotton cords, a consumer desiring to purchase such a roll would most strenuously object to one having a coating which had partially split or separated from the roll. Besides being unsatisfactory from the standpoint of appearance, a separated coating is also undesirable from the standpoint of handling. It would permit of possible damage to the surface of the meat cut as well as present the possibility of contamination of the meat surface through bacterial action.

The conventional method of dipping meat cuts, frozen or unfrozen, has been to merely suspend the meat cut from a conveyor or the like and either manually or otherwise cause the said meat cut to be dropped into the coating solution where it is allowed to remain for a few seconds and then to be lifted from such solution to allow the coating to harden thereon. It is such a process as this which has been found to result in the undesirable separation of the coating from the meat surface when such process is applied to coating a frozen meat cut.

The present invention depends, as stated above, on a partial thawing of the frozen surface of the meat cut prior to the application of a coating thereto. The preferred form of the invention will be set forth in detail below, using, for the purpose of illustration only, the veal roll referred to.

Veal rolls, freshly prepared, are placed in forms and frozen solid at 0° F. or lower. The hard frozen roll is then immersed for a period ranging from 3 to 7 seconds, but preferably around 5 seconds, in a liquid bath maintained at a temperature of around 200° F. A water bath is preferably used although any liquid having no harmful or deleterious effect on the meat may be so used. Following this hot water dip, the frozen roll, having a layer of superficial tissues on the surface thereof partially thawed to a depth from about one-sixty-fourth of an inch to not more than one-sixteenth of an inch, is dipped into a molten coating solution maintained at a temperature of around 110° to 112° F. The duration of the dip into the coating solution is determined by practical conditions of operation and will vary slightly—the shorter the time of immersion, the better the results in general. Under the preferred conditions set forth herein, a double dip has been found to produce satisfactory results. Other methods of applying the coating, as by brushing it on the thawed surface, may be used if so desired.

The coating which is produced by following the method set forth in the preceding paragraph has been found to firmly adhere to the frozen roll at all times. Even when such a coated roll has been merchandised in the thawed state, no separation of the coating from the surface of the meat has been observed. An indication of the adherence of a coating applied by the method of this invention is to be found in the fact that when coated rolls, processed as above, were cut by retailers prior to sale and allowed to completely thaw, the coating showed no tendency to separate from the meat even at the freshly cut surface thereof.

It is not desired to restrict this invention to any particular cut of meat nor to any particular coating solution. However, for the purpose of illustration, the following has been found to be a coating solution which gives very good results when applied in accordance with the teachings of the present invention:

|  | Percent |
| --- | --- |
| Gelatin solution | 45 |
| Oleo stock | 47.9 |
| Wheat flour | 7.0 |
| Lecithin | 0.1 |

Likewise, as previously pointed out, the invention is preferably carried out using a hot liquid dip to partially thaw the frozen meat surface prior to applying the coating solution. However, other means may be used to effect such thawing; for example, exposing the frozen meat cut to a hot air blast, exposing the frozen meat cut to high temperature steam, and other similar methods.

In addition to causing a firm adherence of the coating to the frozen meat surface, the hot water dip as illustrated above has been found to materially reduce the bacteria present on the surface of the meat cut. The following is an average bacterial count obtained from tests carried out with a large number of samples:

|  | Average Bacteria Count per Square Inch |
| --- | --- |
| Frozen Rolls not dipped in hot water | 44,375,000 |
| Frozen Rolls dipped in water at 200° F. for 5 seconds | 503,800 |

This, of course, is a very desirable result from both the standpoint of the consumer and from that of the manufacturer. Since the coating as applied by the method of this invention is not susceptible to cracking or separating, the meat cut will therefore reach the consumer with a much lower bacterial concentration on the surface thereof than has been achieved in the past.

Several factors must be considered in order for the method of this invention to function satisfactorily. The partial thawing must be controlled within the limits indicated previously for two reasons. First, if the roll or other frozen meat cut is not thawed sufficiently, the coating will not adhere properly and the problem of the separating coating will still be present when the frozen meat cut thaws. Secondly, if the thawing is carried out to a greater extent or for a longer period of time, the additional heat will adversely affect the color of the surface of the frozen meat cut. Therefore, the period of immersion—from 3 to 7 seconds—at a temperature of between approximately 190° F. to 200° F. is relatively critical. As earlier pointed out, the optimum immersion period at a temperature of 200° F. is approximately 5 seconds. The temperature of 200° F. is not critical, higher temperatures being desirable in some instances and lower temperatures being capable of use if the time interval of immersion is extended beyond the preferred 5 seconds. However, a temperature of approximately 190° to 200° F. has been found to be the most practical for commercial operating conditions. A further factor which must be considered is the time interval between the hot water dip, or partial thawing step, and the dip in the coating solution. It has been found that between about ½ and 3½ minutes will produce satisfactory results, with the optimum time interval between dips being about 2 minutes. With a longer interval a thicker coating was formed upon dipping, but the coating did not adhere firmly to the surface of the meat cut. With a shorter interval the coating was very thin and necessitated several more dips to give a coating of the desired thickness.

Since the partial thawing of the surface of a frozen meat cut was found to result in a good adherence of the coating, it was thought that it might produce equally as good results to coat the unfrozen meat cut and thereafter freeze. However, such a procedure proved unsatisfactory for several reasons, the primary one of which was that the coating had a tendency to break due to the fact that the unfrozen meat cut did not hold its shape and upon freezing tended to change its shape.

In general, the method of this invention is preferably carried out in a refrigerated room since the meat cuts are intended to be shipped in a frozen state and further since the amount of thawing accomplished by the method of this invention is thereby kept uniform, giving the desired adherence to each coating applied. Also the cold atmosphere substantially decreases the setup time of the coating solution and insures that the thawed coated surface of the frozen meat cut is refrozen before the product is packed for shipment, although it is believed that the mass of the meat itself supplies enough "cold" to effect satisfactory solidification of the coating and the thawed meat surface without the necessity of positively supplying additional refrigeration.

The above description sets forth in detail a method of coating frozen meat cuts which is a definite improvement in the art and which overcomes a major difficulty heretofore encountered in the coating of frozen meat cuts and the like, namely, the tendency of such coatings to separate from the surface of the meat cut upon the thawing thereof. While the foregoing has been directed chiefly to a discussion of the coating of a frozen veal roll, it is obvious that other meat cuts, such as beef, lamb, and pork rolls and roasts, or the like may be treated in a similar manner with the same improved result.

The term "thawing" as used in the claims is intended to mean the change in the aqueous contents of the meat from solid to liquid. The thawing of veal, for example, is intended to mean the change in the state of the water plus salts content of the veal from solid to liquid. The superficial tissues of veal contain from 70 to 75% water and about 1% salts. These salts lower the freezing point of the veal below that of water and, specifically, to around 29° F.

Obviously, many modifications and variations of the invention as hereinbefore set forth may be made without departing from the spirit and scope thereof, and therefore only such limitations should be imposed as are indicated in the appended claims.

I claim:

1. A method of coating meat cuts comprising: freezing the meat cut, subjecting the surface thereof to a thawing action, applying a coating to the thawed meat surface, and thereafter solidifying the said coating on the said meat surface.

2. A method of coating meat cuts comprising: freezing the meat cut, subjecting the surface thereof to a thawing action at a temperature of about 190° to 200° F. for a period of time ranging from three to seven seconds, applying a coating to the meat surface, and thereafter solidifying the said coating on the said meat surface.

3. A method of coating meat cuts comprising: freezing the meat cut, dipping the frozen meat cut into a hot non-toxic liquid bath until the surface is thawed while the interior of the meat remains frozen, thereafter applying a coating to the thawed meat surface, and solidifying the coated surface of the frozen meat cut.

4. A method as in claim 3 wherein the said bath is a hot water bath.

5. A method of coating meat cuts comprising: freezing the meat cut, exposing the frozen meat cut to a hot fluid medium until the surface is thawed while the interior of the meat remains frozen, thereafter dipping the said meat cut into a coating solution whereby a coating is formed on the said thawed surface of the said meat cut, and refreezing the coated surface of said meat cut.

6. A method of coating frozen meat cuts comprising: subjecting the surface of the frozen meat cut to a temperature of about 190° to 200° F. until the surface is thawed while the interior of the meat remains frozen, thereafter applying a continuous coating to the said thawed surface of the frozen meat cut which becomes integral with the said thawed surface of the said frozen meat cut, and refreezing the coated surface of the frozen meat cut.

7. A method of coating frozen meat cuts which comprises: subjecting the surface of said frozen meat cut to a thawing action at a temperature of at least 190° F. until a layer of superficial tissue on the surface of the said frozen meat cut is thawed to a depth between about 1/64 of an inch and about 1/8 of an inch, thereafter applying a continuous coating to the said thawed surface of the frozen meat cut which becomes integral with the said thawed surface of the said frozen meat cut, and refreezing the coated surface of the frozen meat cut.

8. A method of coating frozen meat cuts which comprises: dipping the said frozen meat cut into a water bath maintained at a temperature of between approximately 190° F. and 200° F. for a period of time ranging from 3 to 7 seconds, thereafter applying a continuous coating to the partially thawed meat surface which becomes integral with the said partially thawed meat surface, and solidifying the coated surface of the frozen meat cut.

9. A method of coating frozen meat cuts which comprises: dipping the said frozen meat cut into a water bath maintained at a temperature of between approximately 190° and 200° F. for a period of time ranging from 3 to 7 seconds, thereafter dipping the said partially thawed meat cut into a coating solution, and solidifying the coated surface of the said meat cut.

10. A method of coating frozen meat cuts which comprises: dipping the said frozen meat cut into a water bath maintained at a temperature of between approximately 190° F. and 200° F. for a period of time ranging from 3 to 7 seconds, thereafter dipping the said frozen meat cut into a coating solution maintained at a temperature of about 110° F. to 112° F., and solidifying the coated surface of the frozen meat cut.

11. A method of coating frozen meat cuts which comprises: dipping the said frozen meat cut into a water bath maintained at a temperature of between approximately 190° F. and 200° F. for a period of time ranging from 3 to 7 seconds, thereafter within a period of from ½ to 3½ minutes dipping the said frozen meat cut into a coating solution maintained at a temperature of about 110° F. to 112° F., and solidifying the coated surface of the frozen meat cut.

12. A method of coating a frozen veal roll which comprises: dipping the said frozen veal roll into a water bath maintained at a temperature of about 200° F. for approximately 5 seconds, thereafter within a period of time ranging from ½ to 3½ minutes dipping the said frozen veal roll into a coating solution maintained at a temperature of about 110° F. to 112° F., and solidifying the coated surface of the frozen veal roll.

JOHN M. RAMSBOTTOM.

REFERENCES CITED

The following references are of record in the file of this patent:

UNITED STATES PATENTS

| Number | Name | Date |
|---|---|---|
| 2,337,645 | Cadwell | Dec. 28, 1943 |
| 2,462,760 | Mitchell et al. | Feb. 22, 1949 |